(12) United States Patent
Cho

(10) Patent No.: US 10,421,361 B2
(45) Date of Patent: Sep. 24, 2019

(54) APPARATUS AND METHOD FOR CONTROLLING VEHICLE HAVING MOTOR

(71) Applicants: HYUNDAI MOTOR COMPANY, Seoul (KR); KIA MOTORS CORPORATION, Seoul (KR)

(72) Inventor: Woo Cheol Cho, Daejeon (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 0 days.

(21) Appl. No.: 15/830,623

(22) Filed: Dec. 4, 2017

(65) Prior Publication Data

US 2019/0105990 A1 Apr. 11, 2019

(30) Foreign Application Priority Data

Oct. 11, 2017 (KR) ........................ 10-2017-0129871

(51) Int. Cl.
*B60L 7/18* (2006.01)
*B60T 8/1761* (2006.01)
*B60T 8/172* (2006.01)
*B60T 8/72* (2006.01)
*B60L 15/20* (2006.01)

(52) U.S. Cl.
CPC ............ *B60L 7/18* (2013.01); *B60L 15/2009* (2013.01); *B60T 8/172* (2013.01); *B60T 8/1761* (2013.01); *B60T 8/72* (2013.01); *B60L 2240/423* (2013.01); *B60L 2240/461* (2013.01); *B60L 2240/465* (2013.01); *B60T 2270/602* (2013.01)

(58) Field of Classification Search
CPC .. B60L 7/18; B60L 15/2009; B60L 2240/423; B60L 2240/461; B60L 2240/465; B60T 8/172; B60T 8/1761; B60T 8/72; B60T 2270/602
USPC .......................................................... 701/71
See application file for complete search history.

(56) References Cited

U.S. PATENT DOCUMENTS

2001/0024062 A1* 9/2001 Yoshino ................... B60K 6/48
303/152
2015/0167615 A1* 6/2015 Komuro ................... B60K 6/48
290/31
2017/0057361 A1 3/2017 Cho et al.

* cited by examiner

*Primary Examiner* — Gertrude Arthur Jeanglaude
(74) *Attorney, Agent, or Firm* — Knobbe Martens Olson & Bear LLP

(57) ABSTRACT

A system a vehicle having a wheel-driving motor is disclosed. The system includes wheel speed sensors for detecting speed of respective vehicle wheels, and a controller for controlling coast regenerative torque of the vehicle. The controller lowers coast regenerative torque based on wheel speed acquired detected using the wheel speed sensors. The controller is lowers coast regenerative torque based on speed difference among the wheels and based on change of wheel slip ratio.

18 Claims, 4 Drawing Sheets

APPARATUS AND METHOD FOR CONTROLLING VEHICLE HAVING MOTOR

CROSS-REFERENCE TO RELATED APPLICATION

This application claims under 35 U.S.C. § 119(a) the benefit of priority to Korean Patent Application No. 10-2017-0129871 filed on Oct. 11, 2017, the entire contents of which are incorporated herein by reference.

BACKGROUND (a) Technical Field

The present disclosure relates to an apparatus and a method for controlling a vehicle equipped with a motor, and more particularly, to a control apparatus and a control method for enhancing drivability in an electric vehicle capable of recovering electric energy from kinetic energy of the vehicle through the motor during coasting of the vehicle and capable of charging a battery.

(b) Background Art

Generally, an electric vehicle refers to an automobile that is driven by means of electric power, i.e., an automobile that is driven by means of power of a motor and equipped with a motor as a source of power.

An electric vehicle is an environmentally-friendly vehicle with less pollutant emissions than traditional vehicles equipped with an internal combustion engine (ICE) using fossil fuel such as gasoline or diesel fuel.

Examples of the electric vehicle include a pure electric vehicle (EV) that is driven by a motor powered by electric power stored in a battery, a hybrid electric vehicle (HEV) that is driven by both a motor and a combustion engine, and a fuel cell electric vehicle (FCEV) that is driven by a motor powered by electric power generated from a fuel cell.

Among them, the pure electric vehicle and the fuel cell electric vehicle are driven only by motor power, while the hybrid vehicle is driven by motor power or combined power of the motor and the internal combustion engine (hereinafter, this is simply referred to as "engine").

The disclosure of this section is to provide background of the invention. Applicant notes that this section may contain information available before this application. However, by providing this section, Applicant does not admit that any information contained in this section constitutes prior art.

SUMMARY

Furthermore, the hybrid vehicle includes a motor that is connected to the engine in a manner of transmitting power to the engine to start the engine or to generate electric power by using rotational force transmitted from the engine, which is referred to a hybrid starter and generator (HSG).

In the electric vehicle equipped with the motor as described above, a regenerative mode in which the motor is used as a generator to charge the battery can be performed.

In other words, a regenerative mode in which kinetic energy of the vehicle is converted into electric energy and recovered when the vehicle is being braked or coasting due to inertia is performed, wherein in the regenerative mode, the motor received kinetic energy of the vehicle through drive wheels operates as a generator to charge the battery through an inverter.

In an electric vehicle equipped with a motor including a pure electric vehicle, a hybrid electric vehicle and a fuel cell electric vehicle, as described above, it is possible to enhance fuel efficiency of the vehicle because energy can be recovered by the motor and it is also possible to utilize both a drive motor and a starter generator as a generator for energy recovery.

Particularly, in the electric vehicle equipped with a motor, it is intended to apply regenerative torque depending on vehicle speed during coasting, i.e., coast regenerative torque, to the motor.

In this case, the motor operates as a generator, wherein the motor converts mechanical energy of rotational force transmitted through drive wheels into electrical energy to be stored in a battery, thereby charging the battery.

Furthermore, deceleration of the vehicle is performed when reverse torque in the direction opposite to the driving direction is applied to the motor.

Meanwhile, in the electric vehicle utilizing the motor as a power source, it is general to set coast regenerative torque to a high value in order to increase the rate of energy recovery during coasting.

However, on low friction roads where coefficient of friction of the road surface is small, such as snow roads, ice roads, or rainy roads, slip may occur in the drive wheels of the vehicle due to coast regenerative torque during coasting.

As such, if the wheel slip occurs, driving stability becomes worse.

Typically, in an electric vehicle equipped with an anti-lock brake system (ABS) that detects occurrence of wheel slip and then controls hydraulic pressure for braking, it is designed such that the regeneration mode is stopped when the ABS is operated due to occurrence of wheel slip.

Therefore, the ABS will be actuated when slip occurs in the drive wheels due to the coast regenerative torque during coasting on a low friction road and, if the ABS is actuated, the coast regenerative torque is then set to zero and the regeneration mode is stopped.

As a result, actuation and non-actuation of the ABS may occur alternately and repeatedly and the situation that the coast regenerative torque is applied or not may also occur alternately and repeatedly, resulting in a problem that jerking of the vehicle occurs.

The present disclosure has been made in an effort to solve the above-described problems. An aspect of the present invention is to provide a control apparatus and a control method for enhancing drivability in an electric vehicle capable of recovering electric energy from kinetic energy of the vehicle through the motor during coasting and capable of charging a battery.

Another aspect of the present invention is to provide an apparatus and a control method for controlling an electric vehicle, which enable to improve occurrence of wheel slip due to coast regenerative torque during coasting on a low friction road.

Still another aspect of the present invention is to provide a control apparatus and a control method, which can prevent a problem of deteriorating drivability due to unnecessary execution of control by allowing control for reducing coast regenerative torque to be performed after determining accurately whether the road on which a vehicle in question is currently running has a condition that wheel slip can occur due to coast regenerative torque, particularly, a condition that the running road has low frictional road surface.

In one aspect of the present invention for accomplishing the objects as mentioned above, an apparatus for controlling a vehicle equipped with a motor comprises wheel speed sensors for detecting wheel speed of respective vehicle wheels; and a control section for applying coast regenerative torque for operation of power generation of a motor that receives rotational force through drive wheels during coasting of the vehicle and determining whether to perform control for reducing coast regenerative torque based on information of wheel speed acquired through the wheel speed sensors, wherein the control section is adapted to determine whether to perform the control for reducing coast regenerative torque based on an amount of change of the difference in wheel speed between the wheels per unit time or an amount of change of wheel slip ratio per unit time, which is evaluated from the information of wheel speed.

In another aspect of the present invention, a method for controlling a vehicle equipped with a motor comprises steps of: detecting wheel speed of respective vehicle wheels by wheel speed sensors while coast regenerative torque for operation of power generation of a motor that receives rotational force through drive wheels during coasting of the vehicle is applied; evaluating from information of wheel speed acquired through the wheel speed sensors an amount of change of the difference in wheel speed between the wheels per unit time or an amount of change of the wheel slip ratio per unit time; and determining whether to perform control for reducing coast regenerative torque based on the evaluated amount of change of the difference in wheel speed between the wheels per unit time or the evaluated amount of change of the wheel slip ratio per unit time.

With the apparatus and method for controlling an electric vehicle according to embodiments of the present invention, drivability of the electric vehicle during coasting can be enhanced and occurrence of wheel slip due to coast regenerative torque during coasting on a low friction road and existing problems related thereto can be improved.

In addition, with the control apparatus and method according to embodiments of the present invention, it is possible to prevent a problem of deteriorating drivability due to unnecessary execution of control by allowing control for reducing coast regenerative torque to be performed after determining accurately whether the road on which the vehicle in question is currently running has a condition that wheel slip can occur due to coast regenerative torque, particularly, a condition that the running road has low frictional road surface.

Furthermore, if the control for reducing coast regenerative torque is performed only based on the difference between wheel speeds, unnecessary control for reducing coast regenerative torque is performed even when the vehicle is traversing a speed bump or running on an uneven road, resulting in occurrence of a sense of vehicle jerking and a sense of heterogeneity of drivability. However, according to embodiments of the present invention, since reduction of coast regenerative torque is prohibited when the vehicle traverses the speed bump or a raised spot, or runs on the uneven road, but the control for reducing coast regenerative torque is performed only when the vehicle runs on the low friction road, it is possible to improve problems as mentioned above.

In other words, it is rendered possible to resolve a problem that drivability is deteriorated due to unnecessary and excessive reduction of the coast regenerative torque. In addition, it is rendered possible to enhance the rate of energy recovery and fuel efficiency of the vehicle because any unnecessary reduction of the coast regenerative torque is prevented (it is noted that the rate of energy recovery may be reduced when the coast regenerative torque is reduced).

Other aspects and embodiments of the invention are discussed infra.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The above and other features of the invention are discussed infra.

BRIEF DESCRIPTION OF THE DRAWINGS

The above and other features of the present invention will now be described in detail with reference to embodiments thereof illustrated the accompanying drawings which are given hereinbelow by way of illustration only, and thus are not limitative of the present invention, and wherein.

Figure 1:
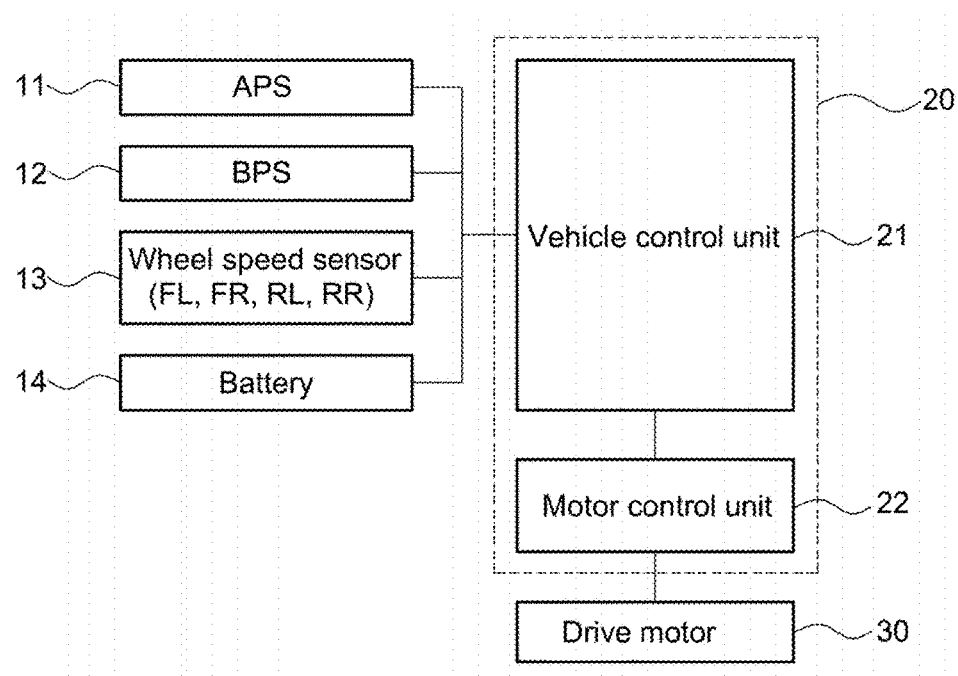
FIG. 1 is a block diagram illustrating a control apparatus according to an embodiment of the present invention.

In the figures, reference numbers refer to the same or equivalent parts throughout the several figures of the drawing.

DETAILED DESCRIPTION

Hereinafter, embodiments of the present invention will be described in detail with reference to the accompanying drawings so that those skilled in the art can easily carry out the present invention. However, the present invention is not limited to the embodiments described herein but may be implemented in other forms.

When a certain part is referred to as "comprising" a certain element, it does not mean that other elements are excluded but means that the part may further comprise other elements unless specifically stated otherwise.

The present disclosure relates to a control apparatus and a control method, which are capable of enhancing drivability of a vehicle equipped with a motor.

The present disclosure relates to a control apparatus and a control method for enhancing drivability in an electric vehicle capable of recovering electric energy from kinetic energy of the vehicle through the motor during coasting and capable of charging a battery.

Furthermore, the present disclosure relates a control apparatus and a control method, which enable to improve occurrence of wheel slip due to coast regenerative torque during coasting on a low friction road.

An aspect of the present invention provides a method for controlling coast regenerative torque for non-slippery road is applied for a braking operation on the slippery road, and applying a second coast regenerative torque for braking operation on the slippery road such that an undesirable wheel slip or ABS activation due to a high coast regenerative torque. A computing device in a vehicle is configured to determine whether the vehicle is driving a slippery road based on (1) speed difference among wheels, (2) rate of wheel speed difference change, and (3) change of bill sleep ratio per unit time.

Particularly, the present disclosure relates to a control apparatus and a control method, which are capable of resolving the following problems in an electric vehicle equipped with an anti-lock brake system (ABS): actuation and non-actuation of the ABS occurs alternately and repeatedly during coasting on a low friction road; application and non-application of coast regenerative torque occurs alternately and repeatedly; and drivability and driving stability of the vehicle are thereby deteriorated.

Still furthermore, the present disclosure relates a control apparatus and a control method, which can prevent a problem of deteriorating drivability due to unnecessary execution of control by allowing control for reducing coast regenerative torque to be performed after determining accurately whether the road on which a vehicle in question is currently running has a condition that wheel slip may occur due to coast regenerative torque, particularly, a condition that the running road is a low friction road.

Features of the present invention can be applied to any vehicle without limit, provided that it is equipped with a motor capable of recovering kinetic energy of the vehicle, i.e., mechanical energy transmitted through drive wheels during coasting as electric energy.

More specifically, features of the present invention can be applied to an electric vehicle utilizing a motor as a power source for driving a vehicle, wherein the electric vehicle in embodiments of the present invention includes a pure electric vehicle, a hybrid vehicle and a fuel cell electric vehicle.

As described above, in the electric vehicle equipped with the motor as the power source, a control section applies coast regenerative torque to the motor during coasting, wherein the motor that receives rotational force from the drive wheels as the coast regenerative torque performs power generation.

When the coast generative torque for operation of power generation of the motor is applied as described above, mechanical energy can be recovered as electric energy through the motor and electric energy generated in the motor can be stored in a battery.

However, when the vehicle coasts on a low friction road, coast regenerative torque for operation of power generation of the motor, that is, reverse torque in the direction opposite to the driving direction acts on both the motor and the drive wheels, with the result that wheel slip may occur.

In order to resolve such problems, a related art document discloses an apparatus and a method for improving occurrence of wheel slip and problems caused thereby by actively varying the coast regenerative torque so as to be adapted to condition of a road surface when wheel slip occurs during coasting on a low friction road.

In the apparatus and method disclosed in the above-mentioned related art document, when the difference in speed between drive wheels and driven wheels (i.e., difference between wheel speeds) is larger than a reference value, it is determined that the vehicle is running on a low friction road and thus control for reducing coast regenerative torque is performed.

However, the difference in speed between drive wheels and driven wheels may occur not only when the vehicle is running on the low friction road but also when the vehicle is traversing a speed bump or a raised spot, or otherwise running on the uneven road such as an off-road.

As a result, in case where the control for reducing the coast regenerative torque is performed only based on the difference in wheel speed as in the related art document, the coast regenerative torque will be excessively reduced when the vehicle traverses the speed bump or the raised spot or otherwise runs on the uneven road, thereby occurring a sense of jerking and a sense of heterogeneity of drivability.

Therefore, there is a need for an apparatus and a method that can resolve the problems in the related art document.

Accordingly, the present disclosure is to resolve the problems in the related art document that drivability is deteriorated due to unnecessary and excessive reduction of the coast regenerative torque by allowing control for reducing coast regenerative torque to be adapted to the road surface condition when wheel slip occurs to be performed such that after determining accurately that the road on which the vehicle is running is a low friction road, the control for reducing coast regenerative torque is performed only at a condition of low friction.

To this end, an embodiment of the present invention is to determine whether the current running road is exactly at a condition of low friction by using not only the difference in wheel speed between vehicle wheels (or the wheel slip ratio) but also the rate (i.e., an amount of change per unit time) of the difference in wheel speed between vehicle wheels (or rate of wheel slip) when determining the condition for proceeding to the control for reducing the coast regenerative torque, and then permit to proceed to the control for reducing the coast regenerative torque only when the road is a low friction road according to the result of the determination.

As a result, an embodiment of the present invention can solve not only the problem in the related art document that wheel slip is caused due to coast regenerative torque applied during coasting on a low friction road with a low coefficient of friction of the road surface and problems related thereto but also the problem existing in the conventional active and variable control of the coast regenerative torque according to the road surface condition (i.e., control for reducing the coast regenerative torque at a condition of a low friction road), i.e., the problem of occurrence of a sense of jerking of a vehicle on a speed bump, an uneven road, or the like, not the low friction road, thereby enhancing the drivability.

FIG. 1 shows a block diagram illustrating a control apparatus according to an embodiment of the present invention. As shown in the figure, control process according to embodiments may be performed by cooperative control of a vehicle control unit (VCU) 21 as a superior control unit for controlling overall operation of a vehicle and a motor control unit (MCU) 22 for controlling operation of a motor 30.

In embodiments, control process may be performed through cooperative control performed by a plurality of control unit, but may be performed by a single control unit in which functions of the control units are integrated.

In the description below, the vehicle control unit and the motor control unit or the single control unit having functions integrated therein will be collectively referred to as a control section.

In addition, the control apparatus according to embodiments of the present invention comprises in addition to the control section 20, a driving information detection section 11, 12, and 13 for collecting various kinds of information necessary for control process in a vehicle, wherein the driving information detection section includes an accelerator position sensor (APS) 11 for detecting the state that a driver operates an accelerator pedal, a brake pedal sensor 12 for detecting the state that the driver operates a brake pedal, and wheel speed sensors 13 for detecting wheel speed of the vehicle.

Here, the wheel speed sensors 13 are provided to detect wheel speed (rotation speed) of each of vehicle wheels.

To this end, the wheel speed sensor 13 may be composed of a plurality of sensors for separately detecting rotational speeds of drive wheels and driven wheels. For example, the wheel speed sensor 13 is composed of a plurality of sensors installed in the left wheel FL and the right wheel FR of the front wheel and the left wheel RL and the right wheel RR of the rear wheel to detect respective rotational speed of the corresponding vehicle wheel.

The difference in wheel speed described later herein may be the maximum value of the difference between respective wheel speeds detected by the wheel speed sensors, or the difference in wheel speed between drive wheels and driven wheels.

For example, if the front wheels are drive wheels receiving rotational force of the motor and the rear wheels are driven wheels, the difference in wheel speed may be a higher value out of a value of the difference in wheel speed between the left wheel FL of the front wheels and the left wheel RL of the rear wheels and a value of the difference in wheel speed between the right wheel FR of the front wheels and the right wheel RR of the rear wheels.

A wheel slip ratio as well as the difference in wheel speed can be evaluated from information of wheel speed detected by the wheel speed sensors 13. Since the wheel slip ratio can be used instead of the difference in wheel speed and the method of evaluating the wheel slip ratio is well known in the art, as will be described later herein, a detailed description thereof will be omitted.

In this configuration, the control section 20, i.e., the vehicle control unit 21 determines whether the vehicle is currently running on a low friction road with a low coefficient of friction of the road surface below a certain level, or otherwise passing over an uneven road such as a speed bump, a raised spot, or an off-road, based on information collected through the driving information detection section 11, 12, and 13 in the vehicle, i.e., information of sensors including the state of operation of the accelerator pedal and the state of operation of the brake pedal and information of wheel speeds of respective vehicle wheels.

In this case, when the accelerator pedal sensor 11 and the brake pedal sensor 12 detects a state of acceleration pedal off and a state of brake pedal off respectively, the control section 20 determines that the vehicle is coasting, i.e. running by inertia force.

Here, it is noted that the state of pedal off is meant by a state in which a driver does not operate a pedal, i.e., the driver releases his/her foot from the pedal (the pedal is released). On the contrary, a state of pedal on is meant by a state that the driver depresses and operates the pedal.

When it is determined that the vehicle is coasting as described above, the control section 20 applies coast regenerative torque to the motor 30 such that the motor regenerates energy, wherein the motor 30 operates as a generator by rotational force transmitted thereto through drive wheels and generates electric power.

In other words, the motor 30 converts mechanical energy of rotational force transmitted thereto through the drive wheels into electric energy (i.e., converts kinetic energy of the vehicle into electric energy), and a battery 14 is charged by electric energy converted at the time.

At the same time, the control section (vehicle control unit) receives and monitors wheel speed of each of vehicle wheels detected by the wheel speed sensors 13 during coasting of the vehicle, and determines whether the road on which the vehicle is currently running is a low friction road based on information of wheel speed collected in real time by the wheel speed sensors 13.

In this case, when it is determined that the vehicle is running on the low friction road, the control section 20 performs control to reduce the coast regenerative torque so as to be adapted to the road surface and allow the motor 30 to regenerate depending on the reduced coast regenerative torque.

For example, in the process of the cooperative control of the vehicle control unit 21 and the motor control unit 22, the vehicle control unit 21 reduces the coast regenerative torque command and transmits it to the motor control unit 22 and the motor control unit 22 applies electric current according to the received coast regenerative torque command to the motor 30.

On the other hand, according to embodiments of the present invention, in order for the control section to be able to determine whether the road on which the vehicle is currently running is a low friction road based on the information of wheel speed, a reference value, kph of the difference in wheel speed or a reference value % of the wheel slip ratio and a reference value kph of the amount of change of the difference in wheel speed or a reference value % of the amount of change of the wheel slip ratio, which are reference values set in the control section (20), are preset in the control section (20) as values according to the coast regenerative torque.

In this case, the reference value of the difference in wheel speed may be set as the maximum value of the difference in wheel speed that can actually occur when the vehicle enters the low friction road, while the reference value of the wheel slip ratio may be set as the maximum value of the wheel slip ratio that can actually occur when the vehicle enters the low friction road.

In addition, as for the reference value of the amount of change of the difference in wheel speed and the reference value of the amount of change of the wheel slip ratio, the reference value of the amount of change of the difference in wheel speed may be set as the maximum amount of change of the difference in wheel speed kph per unit time (e.g., 10 ms) that can actually occur when the vehicle enters the low friction road, while the reference value of the amount of change of the wheel slip ratio may be set as the maximum amount of change of the wheel slip ratio % per unit time (e.g., 10 ms) that can actually occur when the vehicle enters the low friction road.

Such reference values are set as various values according to the coast regenerative torque in the control section 20, wherein the reference value of the difference in wheel speed or the reference value of the wheel slip ratio according to coast regenerative torque and the reference value of the amount of change of the difference in wheel speed or the reference value of the amount of change of the wheel slip ratio according to coast regenerative torque may be set in consideration of actual characteristics of the vehicle such as vehicle weight, weight distribution, coefficient of rolling resistance of tires RRc, and the like.

Figure 2A:
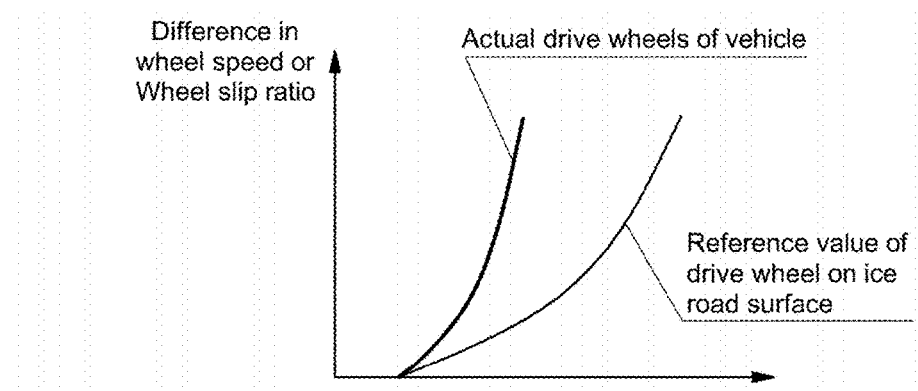
FIGS. 2A and 2B show diagrams illustrating reference values for determining a speed bump, a raised spot, failure of sensors and the like in a control method according to an embodiment of the present invention.
Figure 2B:
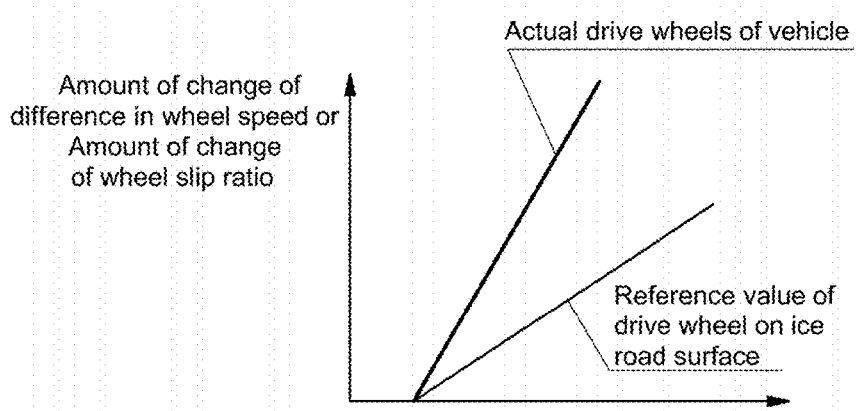

In this case, each of the reference values is preferably set based on a surface of an ice road with the lowest friction, as shown in FIGS. 2A and 2B.

Furthermore, since the difference in wheel speed, the wheel slip ratio, the amount of change of the difference in wheel speed and the amount of change of the wheel slip ratio vary depending on the magnitude of the coast regenerative torque applied to the drive wheels and the vehicle speed even under the same condition of the road surface, each of the reference values is preferably set according to the coast regenerative torque.

Then, during coasting of the vehicle, the control section 20 compares the difference in wheel speed kph or the wheel slip ratio % and the amount of change of the difference in wheel speed kph per unit time or the amount of change of the wheel slip ratio % per unit time, which are acquired in real time, with each of the reference values.

Here, the control section 20 may be set so as to determine that as a result of the comparison, if both the difference in wheel speed or the wheel slip ratio and the amount of change of the difference in wheel speed or the amount of change of the wheel slip ratio, which are acquired in real time, are larger than the respective corresponding reference values, the vehicle is not actually running on the low friction road but the vehicle wheels are instantaneously floating in the air while traversing the speed bump or the raised spot when the vehicle is passing over the speed bump or the raised spot, or otherwise a failure of any of the wheel speed sensors 13 occurs.

In other words, when both the amount of change of the difference in wheel speed and the amount of change of the wheel slip ratio are larger than the respective corresponding reference values, it is determined that the vehicle is passing over the speed bump or the raised spot, or otherwise a failure of any of the wheel speed sensors 13 occurs.

On the other hand, the control section 20 is set so as to determine that even when the difference in wheel speed (or wheel slip ratio) exceeds the corresponding reference value, if the amount of change of the difference in wheel speed (or the amount of change of the wheel slip ratio) exceeds the corresponding reference value, the vehicle is actually running on the low friction road.

When the amount of change of the difference in wheel speed (or the amount of change of the wheel slip ratio) does not exceed the corresponding reference value, it is determined that the wheel slip is caused actually by the low friction road.

By virtue of this feature, the control section 20 can not only accurately determine whether the vehicle is actually running on the low friction road but also discriminate between the situation in which the vehicle is passing over the speed bump or the raised spot, any of the wheel speed sensors 13 is broken down, or the like and the situation in which the vehicle is actually running on the low friction road.

In other words, since there is a limit on the difference in wheel speed and the wheel slip ratio that can increase per unit time according to the amount of coast regenerative torque at the time when the vehicle actually runs on the low friction road, certain embodiment of the present invention is to enable the control section 20 to determine that if the amount of change of the difference in wheel speed per unit time or the amount of change of the wheel slip ratio is larger than the corresponding reference value, the vehicle is not running on the low friction road.

However, since this depends on characteristics of the vehicle, reference values matching the characteristics of the vehicle can be selected in the control section 20. Examples of such reference values preset in the control section 20 are shown in Table 1 below.

TABLE 1

| Coast Regenerative Torque | 0 | 300 Nm | 600 Nm | 900 Nm |
|---|---|---|---|---|
| Reference Value of Amount of Change of Difference in Wheel Speed | 0 | 1 kph | 2 kph | 3 kph |
| Reference Value of Amount of Change of Wheel Slip Ratio | 0 | 1.5% | 3% | 4.5% |

Referring to examples in Table 1, it will be appreciated that in the control section 20, the unit time is set to 10 ms and the reference value of the amount of change of the difference in wheel speed per unit time and the reference value of the amount of change of the wheel speed ratio per unit time may be set differently for each of coast regenerative torques.

It is natural that at least one of the amount of change of the difference in wheel speed and the amount of change of the wheel slip ratio may be used and that at least one of the reference value of the amount of change of the difference in wheel speed and the reference value of the amount of change of the wheel slip ratio may be used.

The reference values are obtained in advance from values according to the coast regenerative torque through the preceding test, evaluation and the like for the vehicle in question, and then input to and stored in the control section 20.

In the examples of Table 1, when the coast regenerative torque is 600 Nm and the difference in wheel speed is increased by 3 kph for 10 ms, since the amount of change of the difference in wheel speed, 3 kph is larger than the reference value for 600 Nm, 2 kph, the control section 20 determines that the vehicle is not running on the low friction road, and does not perform control for reducing the coast regenerative torque (reduction of the coast regenerative torque is prohibited).

On the other hand, when the coast regenerative torque is 900 Nm and the difference in wheel speed is increased by 2 kph for 10 ms, since the amount of change of the difference in wheel speed, 2 kph is smaller than the reference value for 900 Nm, 3 kph, the control section 20 determines that the vehicle is running on the low friction road, and performs control for reducing the coast regenerative torque.

As described above, in embodiments of the present invention, the control section 20 determines that the vehicle is actually running on the low friction road only when the amount of change of the difference in wheel speed (or the amount of change of the wheel slip ratio) per unit time is smaller than the reference value, and then performs control for reducing the coast regenerative torque.

Although it is intended in the embodiment as described above that the reference values are set according to the coast regenerative torque and those reference values are determined according to the current amount of the coast regenerative torque applied during coasting of the vehicle, the coast regenerative torque can be replaced with deceleration speed of the vehicle.

In other words, the reference values may be set according to the deceleration speed of the vehicle and those reference value may be determined according to the current deceleration speed of the vehicle during coasting of the vehicle.

Here, it will be appreciated that the deceleration speed of the vehicle may be a value acquired by a sensor installed in the vehicle (e.g., longitudinal acceleration sensor).

Figure 3A:
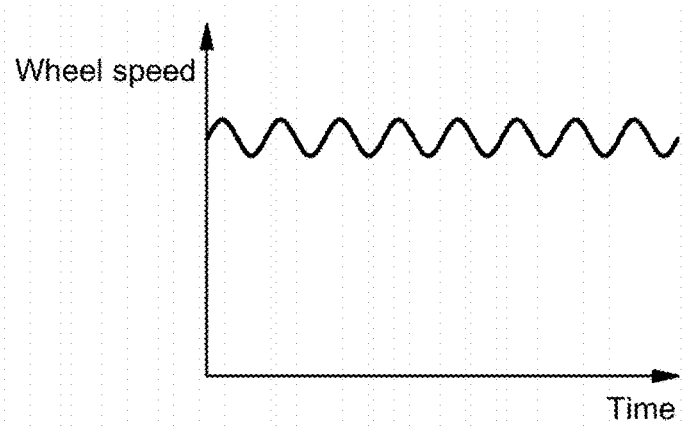
FIGS. 3A and 3B show diagrams illustrating the situation that a vehicle runs on an uneven road.
Figure 3B:
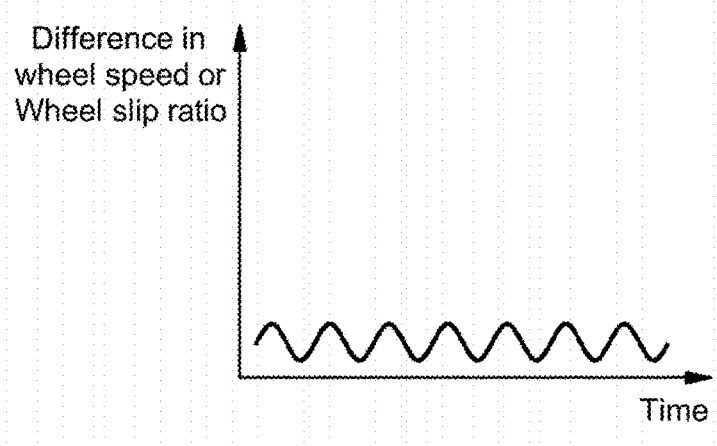

Next, when the wheel speed increases and decreases repeatedly as shown in FIGS. 3A and 3B, that is, when the wheel speed or the difference in wheel speed or the wheel slip ratio instantaneously increases and decreases and this is continuously repeated, it is determined that the vehicle is running on an uneven road such as an off-road.

Although running on the uneven road may instantly fulfill the condition of a reference value of a road surface of an ice road, the difference in wheel speed or the wheel slip ratio is stabilized by itself before reduction of the coast regenerative torque. Therefore, based on this, it is determined that the vehicle is running on the uneven road such as an off-road.

Therefore, in embodiments of the present invention, monitoring the difference in wheel speed or the wheel slip ratio is performed for a predetermined period of time before proceeding to control for reducing coast regenerative torque and identifying whether wheel slip is caused actually by the low friction road is performed.

At this time, it is possible to monitor change of the difference in wheel speed or change of the wheel slip ratio instead of the difference in wheel speed, wherein predetermined values for the change of the difference in wheel speed, kph or the change of the wheel slip ratio, % are input and stored together with a predetermined period of time, ms in advance in the control section 20.

In addition, the control section 20 is set so as to monitor change of the difference in wheel speed or change of the wheel slip ratio for the predetermined period of time before proceeding to control for reducing coast regenerative torque and determines that if an amount of the change is larger than a predetermined value, the vehicle is running on an uneven road.

In this case, if the predetermined period of time is set to be too long, stability of the vehicle on the road surface of the actual low friction road may be poor and thus, it is preferable to set the period of time to about 50 ms, for example, a certain value of the time within the range between 40 ms and 100 ms.

The control section 20 does not perform the control for reducing the coast regenerative torque (reduction of the coast regenerative torque is prohibited) when it is determined that the vehicle is running on the uneven road, whereas the control section performs the control for reducing the coast regenerative torque when the amount of change for the predetermined period of time is equal to or smaller than the predetermined value.

Table 2 shows an example of change of the difference in wheel speed under the state that the predetermined period of time is set to 50 ms in the control section 20, which illustrates that the difference in wheel speed, kph, increases from 0 to 3 and then decreases to 0.5 for 50 ms.

TABLE 2

| | Time | | | | | |
|---|---|---|---|---|---|---|
| | 0 | 10 ms | 20 ms | 30 ms | 40 ms | 50 ms |
| Difference in Wheel Speed | 0 | 1.5 | 3 | 2 | 1 | 0.5 |

In this case, if the predetermined value of the change of the difference in wheel speed is set to 2 kph, the example in Table 2 shows that the change of the difference in wheel speed increases from the predetermined value of 2 kph and then decreases for the predetermined period of time of 50 ms. As such, when such increase and decrease is greater than the predetermined value, the control section 20 determines that the vehicle is currently running on the uneven road such as an off-road.

As described above, when such increase and decrease of the difference in wheel speed occurs repeatedly with an amount of change larger than the predetermined value for the predetermined period of time, it is possible to determine that the vehicle is running on the uneven road. When determining that the vehicle is running on the uneven road, the control section 20 does not perform the control for reducing the coast regenerative torque (reduction of the coast regenerative torque is prohibited).

Although Table 2 shows an example using the difference in wheel speed, wheel slip ratio % can be used instead of the difference in wheel speed, wherein if an amount of change of the wheel slip ratio is larger than a predetermined value % for the predetermined period of time, it is determined that the vehicle is running on the uneven road.

For example, when the predetermined value of the change of the wheel slip rate is set to 3%, if the amount of change of the wheel slip ratio is greater than 3% for the predetermined period of time, that is, if increase and decrease of the wheel slip ratio occurs repeatedly with an amount of change larger than 3%, the control section 20 determines that the vehicle is running on the uneven road and does not perform the control for reducing the coast regenerative torque (reduction of the coast regenerative torque is prohibited).

Figure 4:
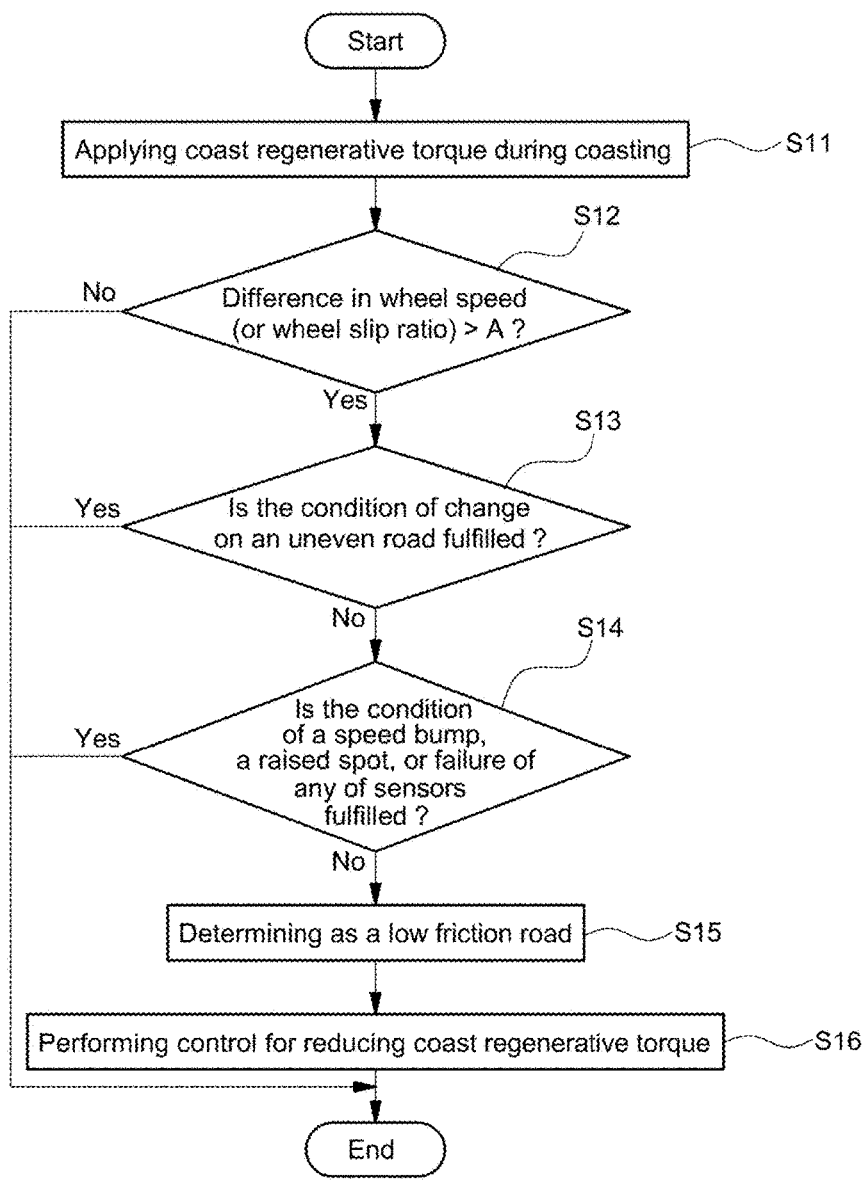
FIG. 4 is a flowchart showing process of control according to an embodiment of the present invention.

Hereinafter, description will be made with reference to FIG. 4 showing a flowchart illustrating process of control according to an embodiment of the present invention.

First, when the vehicle is coasting and therefore coast regenerative torque is applied (in step S11), the control section 20 evaluates in real time the difference in wheel speed (or wheel slip ratio) from information of wheel speed acquired through the wheel speed sensors 13, and compares the difference in wheel speed with the reference value A (in step S12).

Here, if the difference in wheel speed (or the wheel slip ratio) is larger than the reference value A, a step of identifying whether the current running state of the vehicle coincides with the state of running on the road surface of a low friction road is performed.

In other words, the control section 20 monitors in real time the difference in wheel speed (or wheel slip ratio), and determines whether the amount of change of the difference in wheel speed for the predetermined period of time (for example, 50 ms) fulfills the condition of change of the difference in wheel speed on the uneven road, which is larger than the predetermined value (in step S13).

Here, when the condition of change of the difference in wheel speed on the uneven road is fulfilled, the control section 20 determines that the vehicle is running on the uneven road, terminates process of control after process of control in embodiments of the present invention, and does not perform the control for reducing the coast regenerative torque.

On the other hand, when the condition of change of the difference in wheel speed on the uneven road is not fulfilled, the control section 20 compares an amount of change of the difference in wheel speed per unit time with the reference value set according to the amount of coast regenerative torque (in step S14).

Here, if the amount of change of the difference in wheel speed (or wheel slip ratio) per unit time is larger than the reference value, the control section 20 determines that the vehicle is passing over the speed bump or the raised spot, or otherwise a failure of any of the wheel speed sensors occurs.

Here, if the amount of change of the difference in wheel speed (or wheel slip ratio) per unit time is equal to or smaller than the reference value, the control section 20 finally determines that the vehicle is currently running on a low friction road (in step S15), and subsequently performs the control for reducing coast regenerative torque, which follows the established logic (in step S16).

Here, since the process of control for reducing coast regenerative torque can be proceeded according to the well-known process and a detailed method therefor is known, a detailed description thereof will be omitted herein.

Logical blocks, modules or units described in connection with embodiments disclosed herein can be implemented or performed by a computing device having at least one processor, at least one memory and at least one communication interface. The elements of a method, process, or algorithm described in connection with embodiments disclosed herein can be embodied directly in hardware, in a software module executed by at least one processor, or in a combination of the two. Computer-executable instructions for implementing a method, process, or algorithm described in connection with embodiments disclosed herein can be stored in a non-transitory computer readable storage medium.

Although embodiments of the present invention are described in detail as above, it is apparent that the scope of the present invention is not limited to the embodiments described. Variations and modifications that can be made to the present invention by those skilled in the art fall within the scope of the invention.

What is claimed is:

1. An apparatus for controlling a vehicle equipped with a motor, comprising:
    wheel speed sensors for detecting wheel speed of respective vehicle wheels; and
    a control section for applying coast regenerative torque for operation of power generation of a motor that receives rotational force through drive wheels during coasting of the vehicle and determining whether to perform control for reducing coast regenerative torque based on information of wheel speed acquired through the wheel speed sensors,
    wherein the control section is configured to determine whether to perform the control for reducing coast regenerative torque based on an amount of change of a difference in wheel speed between the wheels per unit time or an amount of change of wheel slip ratio per unit time, which is evaluated from the information of wheel speed,
    wherein the control section determines to perform the control for reducing coast regenerative torque when the amount of change of the difference in wheel speed between wheels per unit time is equal to or smaller than a predetermined reference value of an amount of change of the difference in wheel speed or the amount of change of the wheel slip ratio per unit time is equal to or smaller than a predetermined reference value of an amount of change of the wheel slip ratio, and performs the control for reducing coast regenerative torque.

2. The apparatus for controlling a vehicle of claim 1, wherein the reference value of the amount of change of the difference in wheel speed or the reference value of the amount of change of the wheel slip ratio in the control section is a value set for each coast regenerative torque.

3. The apparatus for controlling a vehicle of claim 1, wherein the control section determines not to perform the control for reducing coast regenerative torque when the amount of change of the difference in wheel speed between wheels per unit time is greater than a predetermined reference value of an amount of change of the difference in wheel speed or the amount of change of the wheel slip ratio per unit time is greater than a predetermined reference value of an amount of change of the wheel slip ratio, and performs no control for reducing coast regenerative torque.

4. The apparatus for controlling a vehicle of claim 3, wherein the reference value of the amount of change of the difference in wheel speed or the reference value of the amount of change of the wheel slip ratio in the control section is a value set for each coast regenerative torque.

5. The apparatus for controlling a vehicle of claim 1, wherein the control section is configured to determine whether to perform the control for reducing coast regenerative torque by additionally using the difference in wheel speed between wheels, which is evaluated from the information of wheel speed.

6. The apparatus for controlling a vehicle of claim 5, wherein the control section is configured to determine whether to perform the control for reducing coast regenerative torque according to the amount of change of the difference in wheel speed between wheels per unit time or the amount of change of the wheel slip ratio per unit time when the difference in wheel speed is greater than a predetermined reference value of the difference in wheel speed.

7. The apparatus for controlling a vehicle of claim 1, wherein the control section is configured to determine whether to perform the control for reducing coast regenerative torque by additionally using the wheel slip ratio evaluated from the information of wheel speed.

8. The apparatus for controlling a vehicle of claim 7, wherein the control section is configured to determine whether to perform the control for reducing coast regenerative torque according to the amount of change of the difference in wheel speed between wheels per unit time or the amount of change of the wheel slip ratio per unit time when the wheel slip ratio is greater than a predetermined reference value of the wheel slip ratio.

9. The apparatus for controlling a vehicle of claim 1, wherein the control section is configured to determine whether to perform the control for reducing coast regenerative torque by additionally using an amount of change of the difference in wheel speed between wheels or an amount of change of the wheel slip ratio, which is monitored for a predetermined period of time from the information of wheel speed.

10. The apparatus for controlling a vehicle of claim 9, wherein the control section determines not to perform the control for reducing coast regenerative torque when the amount of change of the difference in wheel speed between wheels or the amount of change of the wheel slip ratio, which is monitored for the predetermined period of time, is greater than each predetermined value, and performs no control for reducing coast regenerative torque.

11. The apparatus for controlling a vehicle of claim 9, wherein the control section is configured to determine whether to perform the control for reducing coast regenerative torque according to the amount of change of the difference in wheel speed between wheels per unit time or the amount of change of the wheel slip ratio per unit time when the amount of change of the difference in wheel speed between wheels or the amount of change of the wheel slip ratio, which is monitored for the predetermined period of time, is equal to or smaller than each predetermined value.

12. A method for controlling a vehicle equipped with a motor, comprising steps of:
    detecting wheel speed of respective vehicle wheels by wheel speed sensors while coast regenerative torque for operation of power generation of a motor that receives rotational force through drive wheels during coasting of the vehicle is applied;

evaluating from information of wheel speed acquired through the wheel speed sensors an amount of change of a difference in wheel speed between the wheels per unit time or an amount of change of a wheel slip ratio per unit time; and determining whether to perform control for reducing coast regenerative torque based on the evaluated amount of change of the difference in wheel speed between the wheels per unit time or the evaluated amount of change of the wheel slip ratio per unit time, wherein determining to perform the control for reducing coast regenerative torque is made when the amount of change of the difference in wheel speed between wheels per unit time is equal to or smaller than a predetermined reference value of an amount of change of the difference in wheel speed or the amount of change of the wheel slip ratio per unit time is equal to or smaller than a predetermined reference value of an amount of change of the wheel slip ratio, and the control for reducing coast regenerative torque is performed.

13. The method for controlling a vehicle of claim 12, wherein determining not to perform the control for reducing coast regenerative torque is made when the amount of change of the difference in wheel speed between wheels per unit time is greater than a predetermined reference value of an amount of change of the difference in wheel speed or the amount of change of the wheel slip ratio per unit time is greater than a predetermined reference value of an amount of change of the wheel slip ratio, and no control for reducing coast regenerative torque is performed.

14. The method for controlling a vehicle of claim 12, wherein determining whether to perform the control for reducing coast regenerative torque is made according to the amount of change of the difference in wheel speed between wheels per unit time or the amount of change of the wheel slip ratio per unit time when the difference in wheel speed between wheels, which is evaluated from the information of wheel speed, is greater than a predetermined reference value of the difference in wheel speed.

15. The method for controlling a vehicle of claim 12, wherein determining whether to perform the control for reducing coast regenerative torque is made according to the amount of change of the difference in wheel speed between wheels per unit time or the amount of change of the wheel slip ratio per unit time when the wheel slip ratio evaluated from the information of wheel speed is greater than a predetermined reference value of the wheel slip ratio.

16. The method for controlling a vehicle of claim 12, wherein determining whether to perform the control for reducing coast regenerative torque is made by additionally using an amount of change of the difference in wheel speed between wheels or an amount of change of the wheel slip ratio, which is monitored for a predetermined period of time from the information of wheel speed.

17. The method for controlling a vehicle of claim 16, wherein determining not to perform the control for reducing coast regenerative torque is made when the amount of change of the difference in wheel speed between wheels or the amount of change of the wheel slip ratio, which is monitored for the predetermined period of time, is greater than each predetermined value, and no control for reducing coast regenerative torque is performed.

18. The method for controlling a vehicle of claim 16, wherein determining whether to perform the control for reducing coast regenerative torque is made according to the amount of change of the difference in wheel speed between wheels per unit time or the amount of change of the wheel slip ratio per unit time when the amount of change of the difference in wheel speed between wheels or the amount of change of the wheel slip ratio, which is monitored for the predetermined period of time, is equal to or smaller than each predetermined value.

\* \* \* \* \*